United States Patent [19]

Shiomi et al.

[11] Patent Number: 5,779,899
[45] Date of Patent: Jul. 14, 1998

[54] FILTER FOR HIGHLY VISCOUS FLUID

[75] Inventors: Kazumitsu Shiomi, Setagaya-ku; Hideo Nakamura, Ichikawa; Akira Kondou, Chiba; Michihiro Kawasaki, Ichikawa, all of Japan

[73] Assignee: Fuji Filter Manufacturing Co., Ltd., Tokyo, Japan

[21] Appl. No.: 600,934

[22] PCT Filed: Jun. 30, 1995

[86] PCT No.: PCT/JP95/01302

§ 371 Date: Aug. 5, 1996

§ 102(e) Date: Aug. 5, 1996

[87] PCT Pub. No.: WO96/00606

PCT Pub. Date: Jan. 11, 1996

[30] Foreign Application Priority Data

Jun. 30, 1994 [JP] Japan ................ 6-149261

[51] Int. Cl.⁶ ................................................. B01D 29/39
[52] U.S. Cl. .......................... 210/346; 210/486; 210/490; 210/496; 210/498; 210/499; 210/767; 264/328.17
[58] Field of Search .................................. 210/345, 346, 210/347, 350, 486, 489, 490, 496, 498, 499, 767, 492; 425/199; 264/328.17

[56] References Cited

U.S. PATENT DOCUMENTS 3,294,241  12/1966  Sicard et al. ................. 210/347
5,449,458   9/1995  Gneuss ......................... 210/346

FOREIGN PATENT DOCUMENTS 2-9855    3/1990  Japan.
4-70112   6/1992  Japan.
6-20588   6/1994  Japan.

*Primary Examiner*—Matthew O. Savage
*Attorney, Agent, or Firm*—Oblon, Spivak, McClelland, Maier & Neustadt, P.C.

[57] ABSTRACT

To provide a filter for highly viscous fluid permitting a foreign matter in a supporting layer to be easily removed and its final layer to be directly washed, a method for efficiently producing a refined polymer by using said filter and a method for producing moldings by molding said refined polymer. A filter for highly viscous fluid according to the present invention comprises a housing (60) involving a cavity, a first rigid perforated plate (25) for partitioning a first chamber in the cavity, a second rigid perforated plate (26) for partitioning a second chamber in the cavity, a first filter (30) jointed to the first perforated plate at a section facing to the second chamber, a second filter (30) joined to the second perforated plate at a section facing to the first chamber, a supporting layer (40) inserted between the first filter and the second filter, an introduction inlet provided in the housing for communicating with the first chamber and the second chamber and a exhaust outlet (65) provided in the housing for communicating with the cavity at a section of the supporting layer.

6 Claims, 5 Drawing Sheets

FILTER FOR HIGHLY VISCOUS FLUID

BACKGROUND OF THE INVENTION

1. Field of the Invention

The present invention relates to a filter for highly viscous fluid as well as a method for producing both a refined polymer by using said filter and moldings by molding said refined polymer.

1. Discussion of the Background

Hereinafter, a conventional filter assembly will be described by referring to FIGS. 4 and 5.

A filter 2 for removing different kinds of contaminated foreign matters and polymeric gel contaminated materials in a high molecule polymer 1 contains nonwoven fabric with different fiber diameters of metallic fine fibers 3 and 4 stacked and two protective wire mesh layers 5 for holding this nonwoven fabric of metallic fine fibers therebetween. The nonwoven fabric and protective wire mesh layers 5 are united in one piece by sintering. This mesh of layer 5 are of, e.g., 100 meshes.

In the filter assembly of FIG. 5, two filters 2 formed in the shape of disk are fixed to each other by sealing at the outer periphery. This one pair of filters 2 are determined to be a primary filter (for unfiltered solution) at the outer side and a secondary filter (for filtered solution) at the inner side.

The high-molecule polymer 1 filtered through this filter assembly is heated to an appropriate temperature, e.g., of 200° C., thereby lowering the viscosity. For allowing the less viscous high-molecule polymer to pass through the above filters, a differential pressure of, e.g., 10 kg/cm² is applied between the first side and the second side of the filter assembly.

To prevent the filters from a damage due to differential pressure 10 kg/cm², a highly rigid ring-shaped supporting layer 6 is incorporated in such a manner as to be in contact with the second filter side of this filter assembly.

The supporting layer 6 comprises a wire mesh layer 7 made of a wire having a diameter of, e.g., 1 mm and two perforated plates 8, e.g., 0.8 mm thick, for holding this mesh layer 7 therebetween.

Between a combination of a pair of filters 2 and 2 with the supporting layer 6 and another, a ring-shaped spacer 9 is interposed. The spacer 9 comprises a wire mesh layer made of a wire having a diameter of, e.g., 1 mm.

A foreign matter deposited on each element in producing each element of a filter apparatus cannot always be cleaned in the cleaning step prior to the assembling.

Thus, after assembling the filter apparatus, cleaning each element is required by a prepurge with the filtered fluid. Because of being polluted with foreign matters, the fluid filtered during the prepurge is not available and wasted.

Though the foreign matters deposited at the primary side of a filter are removed by backwash, in the supporting wire mesh layer located at the second side of the filter, foreign matters, such as, e.g., wax component, are deposited during a long-time operation of the filtration device.

With a conventional filtration device as mentioned above, because of being internally mounted inside a pair of filters 2 and 2, the supporting layer 6 cannot be taken out and washed. And moreover the final layer of the filter cannot be directly cleaned because of being located inside the closed space.

It is one object of the present invention to provide a filter for highly viscous fluid permitting not only foreign matters in a supporting layer to be easily removed but also its final layer to be directly washed, a method for efficiently producing a refined polymer by using said filter and a method for producing moldings by molding said refined polymer.

SUMMARY OF THE INVENTION

According to the invention, the above object is achieved by a filter for highly viscous fluid comprising: a housing involving a cavity; a first rigid perforated member for partitioning a first chamber in the cavity, a second rigid perforated member for partitioning a second chamber in the cavity, a first filter jointed to the first perforated member at a section facing to the second chamber, a second filter joined to the second perforated member at a section facing to the first chamber, a supporting layer inserted in between the first filter and the second filter, an introduction inlet provided in the housing for communicating with the first chamber and the second chamber and a exhaust outlet provided in the housing for communicating with the cavity at a section of the supporting layer.

The invention provides a filter for highly viscous fluid wherein said first perforated member comprises a pair of first disk-shaped perforated plates, said second perforated member comprises a pair of second disk-shaped perforated plates spaced adjacent to said pair of first disk-shaped perforated plates, each of said first and second filters comprises annular nonwoven fabric with different fiber diameters of metallic fine fibers stacked and two annular protective wire mesh layers for holding this nonwoven fabric of metallic fine fibers therebetween, and the annular nonwoven fabric and annular protective wire mesh layers are sintered in one piece.

The invention provides a filter for highly viscous fluid wherein said supporting layer is so arranged as to be divided along the diameter direction into halves.

The invention provides a method for producing a refined polymer characterized in that foreign matters in a polymer are removed by using said filter.

The invention provides a method for producing moldings by removing foreign matters in a polymer by using said filter thereby producing a refined polymer and further molding said refined polymer.

DESCRIPTION OF THE PREFERRED EMBODIMENTS

Figure 1:
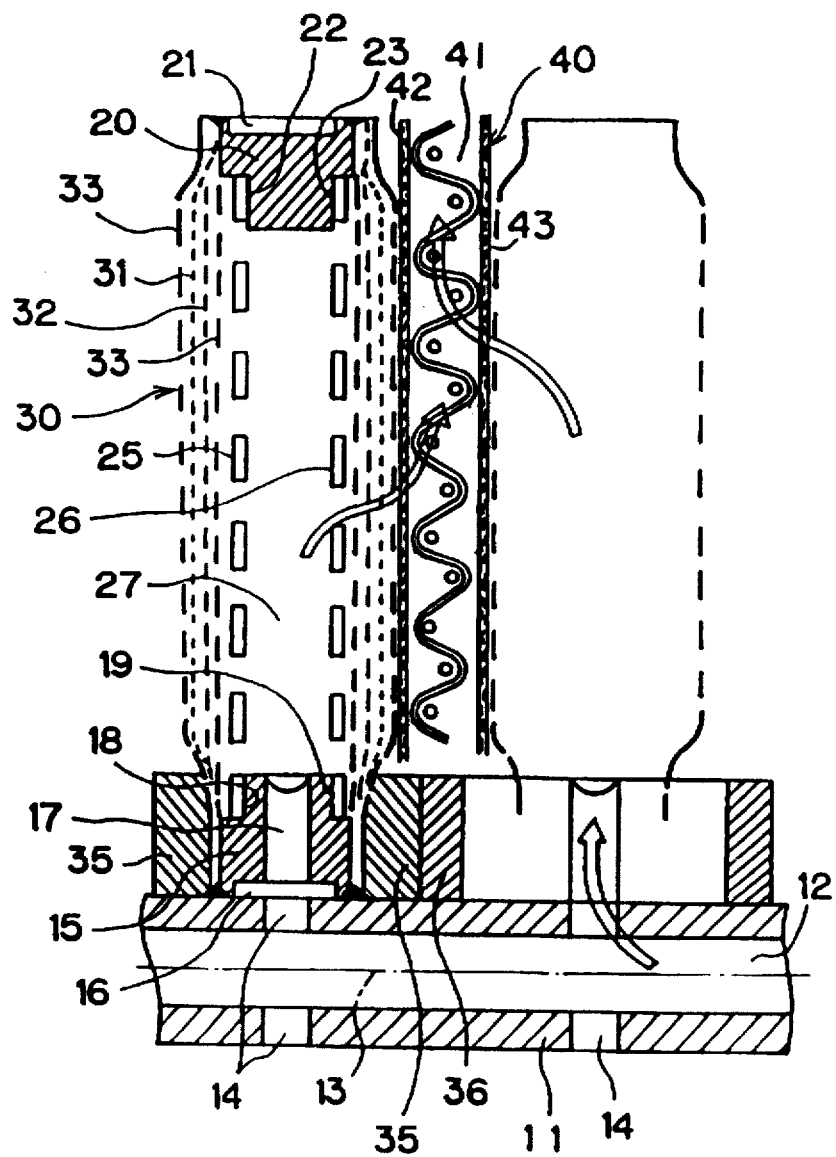
FIG. 1 is a partly longitudinal sectional view of a filter assembly in a filter device according to the present invention.

According to the invention, foreign matter deposited in the first or second chamber are removable by backwash, whereas foreign matters deposited in the supporting layer due to a long-time use of the filter, such as e.g., wax, are easily removable from the supporting layer as a result of easily detaching the supporting layer from an assembly of first and second perforated members and first and second filters by detaching said assembly from the cavity of the housing, further enabling the final layer to be directly washed. With the invention, the first perforated member comprises a pair of first disk-shaped perforated plates, the second comprises a pair of second disk-shaped perforated plates spaced adjacent to said pair of first disk-shaped perforated plates, each of said first and second filters comprises annular nonwoven fabric with different fiber diameters of metallic fine fibers stacked and two annular protective wire mesh layers for holding this nonwoven fabric of metallic fine fibers therebetween, and the annular nonwoven fabric and annular protective wire mesh layers are sintered in one piece, thereby enabling the backwash and detachment cleaning more surely and more easily. With the invention, since the supporting layer is so arranged as to be divided along the diameter direction into halves, detachment cleaning is further easy. With the invention, a highly refined polymer is obtained by using the filter for highly viscous fluid.

With the invention, moldings fit for a strict use in quality standard for foreign matters or the like are obtained by using the filter for highly viscous fluid.

Embodiments

Hereinafter, the present invention will be described by referring to the preferred embodiments shown in the drawings.

The central shaft 11 of hexagonal section of FIG. 1 has a central hole 12. Incidentally, the central shaft is of hexagonal section in FIG. 1, but has only to be of polygonal section. On the central shaft 11, radial holes 14 for communicating the central hole 12 with the outside of the central shaft 11 in one position of the central shaft 11 relative to the direction of the longitudinal axis 13 are provided at six angularly equispaced positions around the longitudinal axis 13. Similarly at equal spaces from the one position in the longitudinal direction 13, radial holes 14 are in a multiple arrangement.

At the position corresponding to each radial hole 14, a ring collar 15 is put in the central shaft 11. In the internal circumference of the collar 15, crescent spaces 16 communicating with radial holes 14 are formed. On a collar 15, six radial holes 17 for communicating the respective spaces 16 with the outer periphery are provided at equal angular spaces. In the outer periphery on both end surfaces of the collar 15, ring-shaped steps 18 and 19 are provided, respectively.

Around a collar 15, a ring 20 is disposed coaxially with the collar 15. In the outer periphery of the ring 20, a ring-shaped groove 21 is provided. In the inner circumference on both end faces of the ring 20, ring-shaped steps 22 and 23 are provided, respectively.

With a ring-disk type perforated plate 25, not only its inner circumference is fitted in the ring-shaped step 18 but also its outer periphery is fitted in the ring-shaped step 22. With a ring-disk type perforated plate 26, not only its inner circumference is fitted in the ring-shaped step 19 but also its outer periphery is fitted in the ring-shaped step 23. The collar 15, the ring 20 and the perforated plates 25, 26 are mutually cooperate to define a ring-shaped space 27.

Each of the perforated plates 25 and 26 is 0.8 mm in plate thickness, 1 mm in the diameter of a hole and 2 mm in inter-hole distance, while their mutual distance is 3 mm.

Outside the perforated plates 25 and 26, ring-shaped disk type filters 30 are disposed, respectively. This filter 30 comprises a nonwoven fabric with different fiber diameters of metallic fine fibers 31 and 32 stacked, and two wire mesh layers 33 for holding this metallic fine fiber nonwoven fabric therebetween. The metallic fine fibers 31, 32 and protective wire mesh layers 33 are sintered in one piece. These mesh layers 33 are of, e.g., 100 meshes.

With the filter 30, its outer periphery is welded for sealing to the outer periphery of the end face of the ring 20 and its inner circumference is fitted in the central shaft 11. The inner circumference of the filter 30 is interposed between the collar 15 and the ring-shaped disk 35 adjacent to the collar 15 and fitted in the central shaft 11, while the inner circumference of the filter 30, the collar 15 and the disk 35 are welded to each other.

Between the disks 35 and 35 between the adjacent filters 30, a ring-shaped gasket 36 is interposed.

Between the adjacent filters 30 and 30, a ring-shaped supporting layer 40 is interposed. The supporting layer 40 comprises a unitedly sintered wire mesh layer 41 made of 1.2 mm diameter wires and two nonwoven fabrics 42 each made of unitedly sintered metallic fine fibers. The mesh layer 41 is 1.4 mm thick and each of nonwoven fabrics 42 and 43 is 0.73 mm. The supporting layer 40 serves as a spacer between the filters 30 and 30.

Hereinafter, modifications of the supporting layer 40 will be described by referring to FIGS. 6 and 7.

Figure 6:
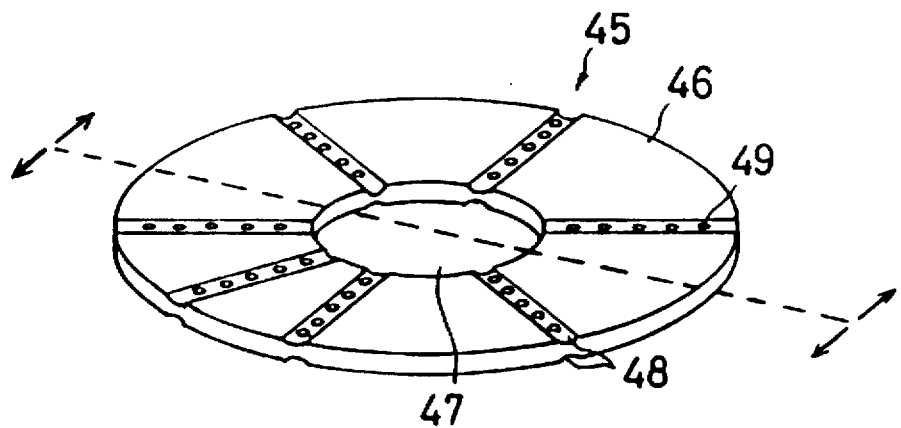
FIG. 6 is a perspective view of a first modification of the supporting layer.

As one modification of the supporting layer 40, a supporting layer 45 comprises a metal disk 46 as shown in FIG. 6. In the center of the disk 46, a hole 47 for the shaft 12 to be inserted is provided. On each surface of the disk 46, grooves 48 are radially provided, on each of which holes 49 are provided at equal spaces.

Figure 7:
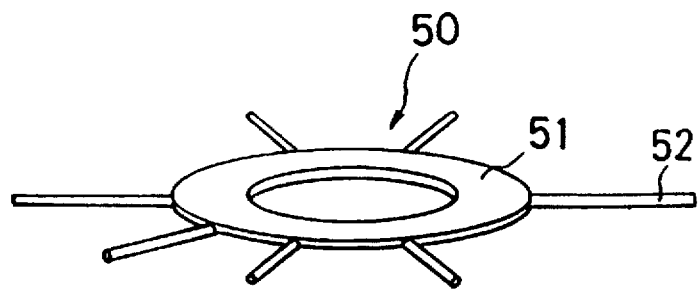
FIG. 7 is a perspective view of a second modification of the supporting layer.

As another modification of the supporting layer 40, a supporting layer 50 comprises a metal ring 51 for the shaft 12 to be passed through and a metal rod-shaped member 52 radially extending from the ring 51 as shown in FIG. 7.

Figure 2:
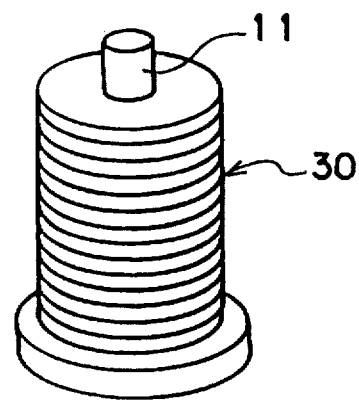
FIG. 2 is a perspective view of the filter assembly of FIG. 1.

A set of assembly of filters 30 and supporting layer 40 is mounted on the central shaft 11 at a multilevel arrangement, thus constructing such a filter assembly as shown in FIG. 2.

The assembly of filters 30 and the supporting layer 40 are individually detachable from the shaft 11 along the axis direction.

To facilitate the detachment from the shaft 11, the supporting layers 40 may be so constructed as separable in halves relative to the diameter direction as shown, for example, in conjunction with the modified supporting layer 45 of FIG 6.

Figure 3:
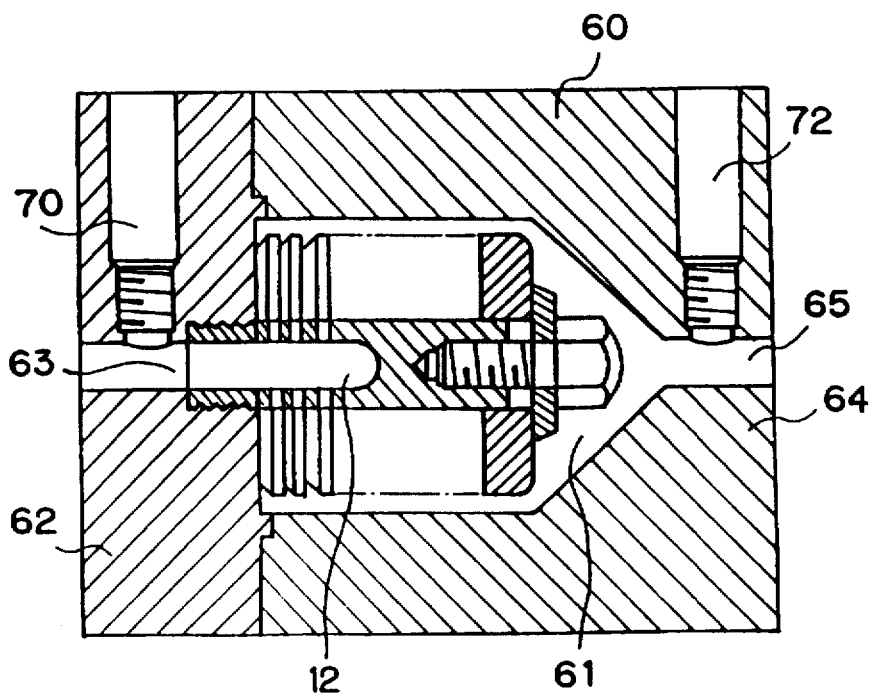
FIG. 3 is a longitudinal sectional view of a filter device according to the present invention.
Figure 4:
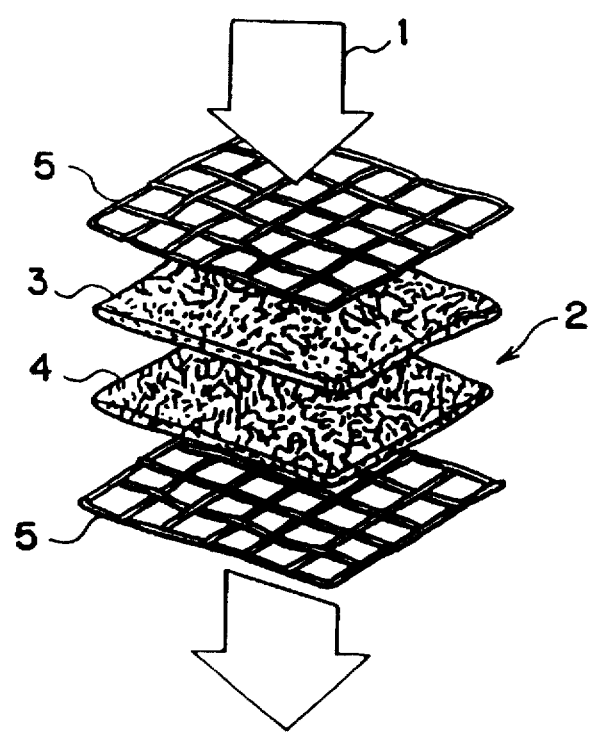
FIG. 4 is an explanatory drawing of a conventional filter.
Figure 5:
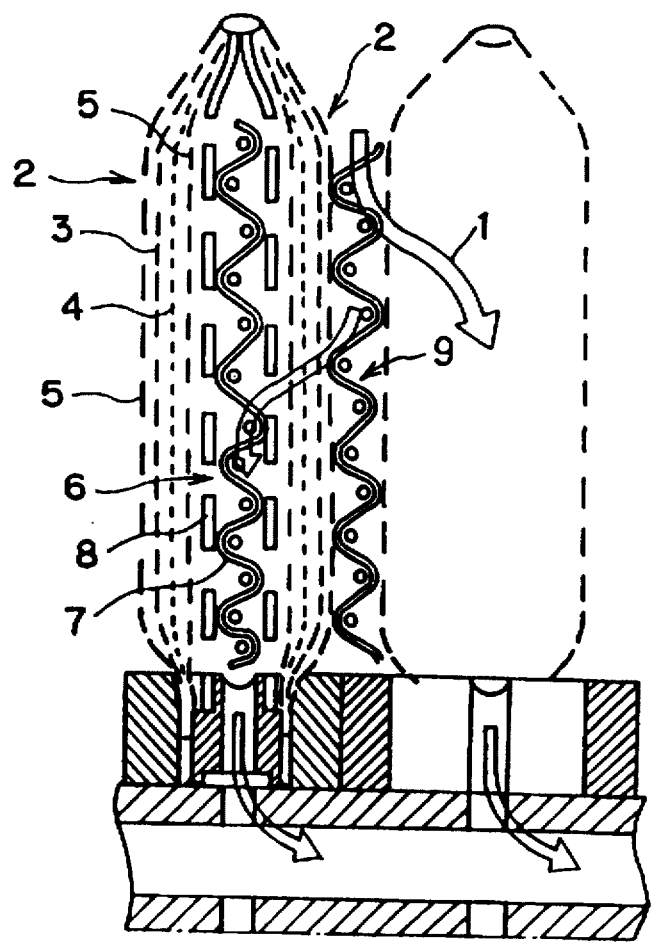
FIG. 5 is a longitudinal sectional view of a conventional filter.

The above filter assembly is housed in the cavity 61 inside the housing 60 shown in FIG. 3. The cavity 61 inside the housing 60 is closed with a head cap 62. The central shaft 11 is, for example, screwed into the head cap 62. At the head cap 62, an introduction inlet 63 for not only communicating the central hole 12 of the central shaft 11 with the outside of the housing 60 but only introducing a high molecule polymer heated at 200° C. into the central hole 12. At the bottom 64 of the housing 60, an exhaust outlet 65 for not only communicating the cavity 61 with the outside of the housing 60 but only exhausting the fluid in the cavity is provided.

At the head cap 62, a pressure-gauge mounting hole 70 communicating with the introduction hole 63 is provided and an introduction hole pressure gauge is mounted in this hole 70. At the bottom of the housing 60, a pressure gauge mounting hole 72 communicating with the exhaust outlet 65 is provided an exhaust outlet pressure gauge is mounted in this hole 72.

Hereinafter, the operation of the this embodiment will be described.

By using a pump not shown, a high-molecule polymer fluid heated at 200° C. is introduced through the introduction hole 63 into the central hole 12. The introduced fluid is led through a radial hole 14, a space 16 and a radial hole 17 to a ring-shaped space 27. This led fluid passes a filter 30 via holes of a perforated plate 25, further passes a supporting layer 40 and reaches to a cavity 61. In this case, because of being supported by the supporting layer 40, the filter 30 withstands the pressure applied to the fluid and is not damaged.

Foreign matters filtered through the filter 30 and gel foreign matters are deposited in the ring-shaped space 27 and inside the filter 30. The fluid passed through filter 30 is exhausted from the exhaust outlet 65 to outside the housing 60. The differential pressure between the introduction inlet 63 and the exhaust outlet 65 is 10 kg/cm$^2$ or more.

With the arrangement of this embodiment, when the filter 30 is clogged up, since an increase in the internal pressure of the space 27 leads to expansion of the collar 15 due to internal pressure, the gasket 36 is pressed so much toward the axis 13 as to have a shape of self-contracted gasket, thereby increasing the sealing capability.

Foreign matters are deposited not only in the space 27 and the filter 30, but such as foreign matters as, e.g., wax, are deposited also in the supporting layer 40.

In the case of removing foreign matters in the space 27 and the filter 30, backwash is carried out after interrupting the operation of a filter awhile. In this case, supported by the perforated plates 25 and 26, the filter 30 withstands the backwash pressure and are not damaged.

In addition, there is a method for regenerating a filter 30 comprising the steps of dismounting the head cap 62 as the whole filter assembly from the housing 60, detaching the filters 30 together with the supporting layer 40 from the central shaft 11 and either dissolving the foreign matters deposited on the filters 30 and the supporting layer 40 with a solvent or burning them off. Then, after assembling a filter, the filter is washed and further the second side face thereof is washed with jet water.

Next, when polyethylene in use for masking films was refined with this inventive filter of 10 μm specification attached to the tip of an extruder, foreign matters, 30 μm or larger in size, could be removed by 99.9% or more and a clean polyethylene was obtained.

Polymers capable of being refined by using this inventive filter are not especially limited, but in addition to the polyethylene mentioned above, for example, polypropylene, ethylene-vinyl acetate copolymer, polymethyl methacrylate, polycarbonate and the like can be mentioned.

Also, methods for molding a refined polymer are not especially limited, but for example, extrusion molding, injection molding, film treatment, coating treatment, and the like can be mentioned.

Furthermore, speaking of moldings obtained from molding treatment by using a refined polymer, for example, a masking film made from ethylene-vinyl acetate copolymer or polyethylene, a laminate film made from ethylene-vinyl acetate copolymer, polyethylene or polypropylene, an optical disk made from polycarbonate, a transparent plastic glass made from polymethyl methacrylate, a capacitor film made from polypropylene, a cable made from polyethylene and the like can be mentioned.

What is claim as new and desired to be secured by Letters Patent of the United States is:

1. A filter for highly viscous fluid comprising:

a housing which encloses a cavity;

a first rigid perforated member for partitioning a first chamber in the cavity;

a second rigid perforated member for partitioning a second chamber in the cavity;

a first filter disposed adjacent to the first perforated member and between the first and the second chambers;

a second filter disposed adjacent to the second perforated member and between the first and second chambers;

a supporting layer inserted between the first filter and the second filter;

an introduction inlet provided in the housing for communicating with the first chamber and the second chamber; and an exhaust outlet provided in the housing for communicating with the cavity at a section of the supporting layer;

wherein said first perforated member comprises a pair of first disk-shaped perforated plates;

said second perforated member comprises a pair of second disk-shaped perforated plates spaced adjacent to said pair of first disk-shaped perforated plates;

each of said first and second filters comprises annular nonwoven fabric with different fiber diameters of metallic fine fibers stacked and two annular protective wire mesh layers for holding the nonwoven fabric of metallic fine fibers therebetween; and the annular nonwoven fabric and annular protective wire mesh layers are mutually sintered in one piece.

2. The filter for highly viscous fluid as set forth in claim 1, wherein said supporting layer is separable into halves.

3. A method for producing a refined polymer wherein foreign matters in a polymer are removed by using the filter as set forth in claim 2.

4. A method for producing moldings by removing foreign matters in a polymer by using said filter as set forth in claim 2, producing a refined polymer and further molding said refined polymer.

5. A method for producing a refined polymer wherein foreign matters in a polymer are removed by using the filter as set forth claim 1.

6. A method for producing moldings by removing foreign matters in a polymer by using said filter as set forth claim 1, producing a refined polymer and further molding said refined polymer.

* * * * *